US006405046B1

United States Patent
Kumaran et al.

(10) Patent No.: US 6,405,046 B1
(45) Date of Patent: Jun. 11, 2002

(54) METHOD FOR PARTITIONING MOBILE STATIONS OF A WIRELESS NETWORK BETWEEN AN OVERLAY AND AN UNDERLAY

(75) Inventors: Krishnan Kumaran, Scotch Plains; Philip Alfred Whiting, New Providence, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/369,687

(22) Filed: Aug. 6, 1999

Related U.S. Application Data
(60) Provisional application No. 60/103,478, filed on Oct. 8, 1998.

(51) Int. Cl.⁷ .................................................. H04Q 7/22
(52) U.S. Cl. ...................... 455/453; 455/444; 455/446; 455/509
(58) Field of Search ................................. 455/444, 443, 455/446, 449, 450, 451, 452, 453, 422, 509, 524

(56) References Cited

U.S. PATENT DOCUMENTS

| | | | |
|---|---|---|---|
| 4,613,990 A | 9/1986 | Halpern | 455/33 |
| 4,736,453 A | 4/1988 | Schloemer | 455/33 |
| 5,353,332 A | * 10/1994 | Raith et al. | 455/444 X |
| 5,557,657 A | 9/1996 | Barnett | 379/60 |
| 6,091,955 A | * 7/2000 | Aalto et al. | 455/450 X |

FOREIGN PATENT DOCUMENTS

| | | | |
|---|---|---|---|
| WO | WO95/16332 | 6/1995 | H04Q/7/36 |
| WO | WO97/14260 | 4/1997 | H04Q/7/38 |

OTHER PUBLICATIONS

F. Kojima, et al., "Radio Resource Management Technique For Multilayered Cell System With Different Bandwidths", Electronics Letters, vol. 33, No. 15, pp. 1297–1298, Jul. 17, 1997.
European Search Report No. EP 99307653.8–2209, Feb. 2, 2000—European Patent Office—The Hague.

\* cited by examiner

*Primary Examiner*—William Trost
*Assistant Examiner*—Philip J. Sobutka
(74) *Attorney, Agent, or Firm*—M. I. Finston (57) ABSTRACT

A method is described for partitioning the mobile stations occupying each of a plurality of cells of a wireless communication network between an overlay and an underlay. Within each cell, each of that cell's mobile stations is assigned to the overlay if the mobile station's corresponding path loss exceeds a path-loss threshold, and to the underlay if its corresponding path loss lies below the path-loss threshold. The path-loss threshold for each cell is determined according to a procedure that seeks to drive network capacity up while satisfying a rule that relates to intercell interference.

13 Claims, 8 Drawing Sheets

METHOD FOR PARTITIONING MOBILE STATIONS OF A WIRELESS NETWORK BETWEEN AN OVERLAY AND AN UNDERLAY

CROSS-REFERENCE TO RELATED APPLICATION

This application claims priority of Provisional Application Serial No. 60/103,478 which was filed Oct. 8, 1998.

FIELD OF THE INVENTION

The invention relates to mobile wireless communication networks in which the communication channels are partitioned into overlay channels that are potentially accessible by any mobile station (within a pertinent cell), and underlay channels that are accessible only by mobile stations having relatively low path loss. More particularly, the invention relates to methods for determining how the channels are to be partitioned, and for setting the criterion that identifies those mobile stations that may have access to underlay channels.

ART BACKGROUND

In the operation of mobile wireless communication networks, the danger of interference between cells is one factor that limits the number of cells in which a given communication channel (e.g., a frequency channel) can be used. However, increasing the number of cells in which a given channel is used is advantageous, because it allows the total available radio-frequency spectrum to be used more efficiently, and thus increases the total information-carrying capacity of the network.

Practitioners in the art of wireless communication have recognized that some of the mobile stations within a given cell are less prone to cell-to-cell interference then others. More specifically, those mobile stations that suffer relatively small path loss to or from their (currently serving) base station can communicate with such base station with a concomitantly low danger of interference with neighboring base stations, provided that the path loss to the neighboring base stations is relatively high.

Practitioners in the art have further recognized that by giving special treatment to such mobile stations, it is possible to increase the capacity of the network. Such an approach to capacity enhancement is sometimes referred to as "reuse partitioning." A network that is designed to give such special treatment to a class of mobile stations is here referred to as an underlay-overlay (U-O) network."

In a U-O network, each cell includes an overlay (or outer cell) region, and an underlay (or inner cell) region. The underlay is typically distinguished from the overlay by having smaller path loss between mobile stations and the serving base station. The available channels are partitioned into two groups, which we refer to as A-channels and B-channels. The A-channels are assigned to the overlay, but are potentially accessible by all mobile stations. The B-channels are accessible only to mobile stations in the underlay. (Mobile stations in the overlay and underlay are referred to, respectively, as A-mobiles and B-mobiles.)

Each of the B-mobiles has a path loss to the serving base station that is less than a threshold $P_i$, where the index i, i=1, . . . , N identifies a given one of the N cells in the network. The A-mobiles, which occupy the overlay, have higher path losses. Because the B-mobiles have lower path losses, the B-channels can be reused more frequently than the A-channels.

Typically, power control is applied between the mobile stations and the serving base station. One example of power control is constant received power control, in which the transmitted power in the uplink (and in some cases, also on the downlink), is regulated to compensate for the path loss to the receiving station. In such a case, at least the uplink transmissions between the base station and the B-mobiles will have lower power than those between the base station and the A-mobiles. This tends to further reduce interference throughout the network, and thus to extend the scope and effectiveness of the overlay.

The proportion of a cell's traffic that can be supported within the underlay is referred to as the absorption, which we represent below by the symbol $\alpha$. The pertinent traffic is made up of those mobile stations that have relatively low path loss to their serving base station, and relatively high path loss to neighboring base stations. Such mobile stations, as noted, are referred to as the B-mobiles. The network capacity is increased by permitting the B-mobiles to reuse channels more frequently than the A-mobiles. The proportion of mobile stations that are B-mobiles will depend upon the actual level of channel reuse, the propagation characteristics between cells in the pertinent part of the network, and the actual geographical distribution of mobile stations (at a given time).

The efficacy of a U-O network is sensitive to the particular scheme used for allocating channels between the underlay and overlay networks. The simplest scheme is to make a fixed allocation. However, this scheme loses some trunking efficiency. Trunking efficiency is the gain in network capacity that is obtained by sharing channels freely in order to accommodate fluctuations in traffic. As a consequence, the fixed allocation scheme tends to reduce the gains in performance otherwise achievable through the increased frequency of channel reuse in the underlay.

There has remained a need for an allocation method that maximizes, or nearly maximizes, the capacity gains potentially available from the U-O approach.

SUMMARY OF THE INVENTION

We have devised such an allocation method. In accordance with our new method, underlay calls are permitted to overflow onto overlay channels. Moreover, the boundaries of the underlay cells are chosen adaptively, in such a way that the risk of excessive interference is constrained within an acceptable level. In this way, network resources can be used efficiently in the presence of the inhomogeneities in traffic and in signal propagation characteristics that are typical of real networks. Within each cell, the underlay boundary is defined by a respective path-loss threshold. In this context, we use the term design (of U-O networks) to include, inter alia, the allocation of channels between the overlay and the underlay, and the setting of the underlay boundaries.

In a broad aspect, our method involves obtaining a blocking curve for each cell. The blocking curve expresses the manner in which the average blocking (i.e., the refusal to accept an offered call) depends upon the absorption in the given cell. The blocking curve may be based upon a theoretical, or a partially empirical, model of cell traffic. Parameters that affect the blocking curve will typically include the total spectrum (i.e., the total available number of channels), the channel split, and the rate of traffic offered to the given cell.

Figure 7:
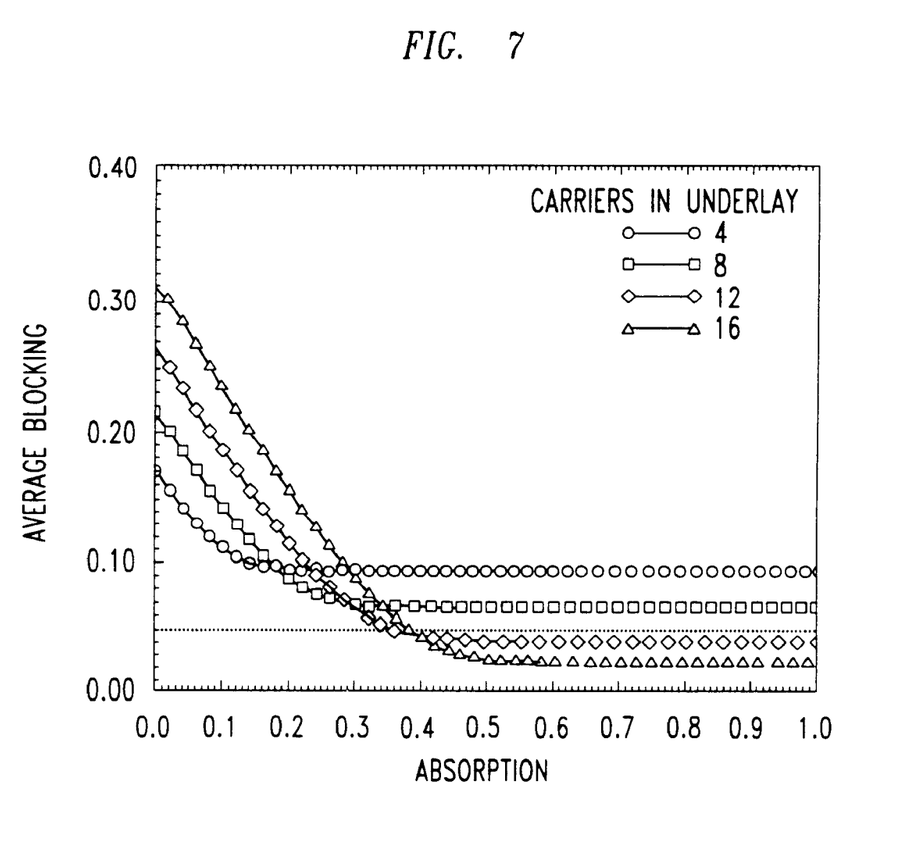
FIG. 7 is an illustrative set of blocking curves useful in the practice of the invention.

In a typical blocking curve, the blocking decreases as the absorption increases. However, there is generally some value of absorption above which the rate of decrease is relatively small. Thus, such a blocking curve (as shown, e.g., in FIG. 7) can be used to establish an operating range, beginning at the smallest absorption value sufficient to meet a target level of blocking performance, and ending at an absorption value above which the rate of further improvement is relatively small.

For each cell, a respective approximation, such as a linear approximation, is chosen to represent such cell's blocking behavior within the operating range. There is then defined an objective function for the overall network, based on the respective single-cell approximations. Optimization of this objective function is equivalent to maximization of network capacity.

From path-loss measurements for each cell, there is determined a parametric dependence of absorption upon the path-loss-threshold $P_i$. The path-loss thresholds at the ends of the operating range are also determined. This enables the objective function to be treated as a function of the path-loss thresholds, and enables the operating range to be defined in terms of the path-loss thresholds.

The objective function is optimized over the path-loss thresholds. This optimization is subject to the constraint that each path-loss threshold must lie within its respective operating range, and to the constraint that the risk of unacceptable interference must be less than a stated level.

The result of the optimization procedure is a set of optimal values for the respective path-loss thresholds. Each of these path-loss thresholds defines the underlay boundary for its corresponding cell.

Typically, there will initially be many potential channel splits. However, not all of these channel splits will be feasible. For example, some channel splits may provide insufficient underlay channels to meet the target level of blocking performance. As a further example, some channel splits may fail to satisfy the interference constraint for one or more cells. Accordingly, certain embodiments of the invention include a step of pruning the channel splits, leaving only those channel splits that are feasible in view of pertinent constraints. The optimization of the objective function is separately carried out for each of the feasible channel splits. The overall network blocking is computed for each of the resulting optimal solutions. For the ultimate network design, that channel split is selected that gives the least overall network blocking.

Detailed Description

A reuse factor expresses the inverse frequency of reuse of a channel. Thus, for example, if a given channel has a reuse factor of 3, it is used once per 3 cells. Let $C_A$ represent the average number of A-channels available per cell, and let CB represent the average number of B-channels per cell. Let the A-channels have a reuse factor $r_A$, and let the B-channels have a reuse factor $r_B$. Then the channel split $C_A$, $C_B$ is related to the total number C of channels available to the network according to $r_A C_A + r_B C_B = C$. That is, if, e.g., the A-channels have a reuse factor of 3, then the total number of A-channels used in the network is three times the average number used within a single cell. A similar argument applies to the B-channels.

It will be clear from the above discussion that given the total number C of channels, the two reuse factors determine a family of possible channel splits.

Figure 1:
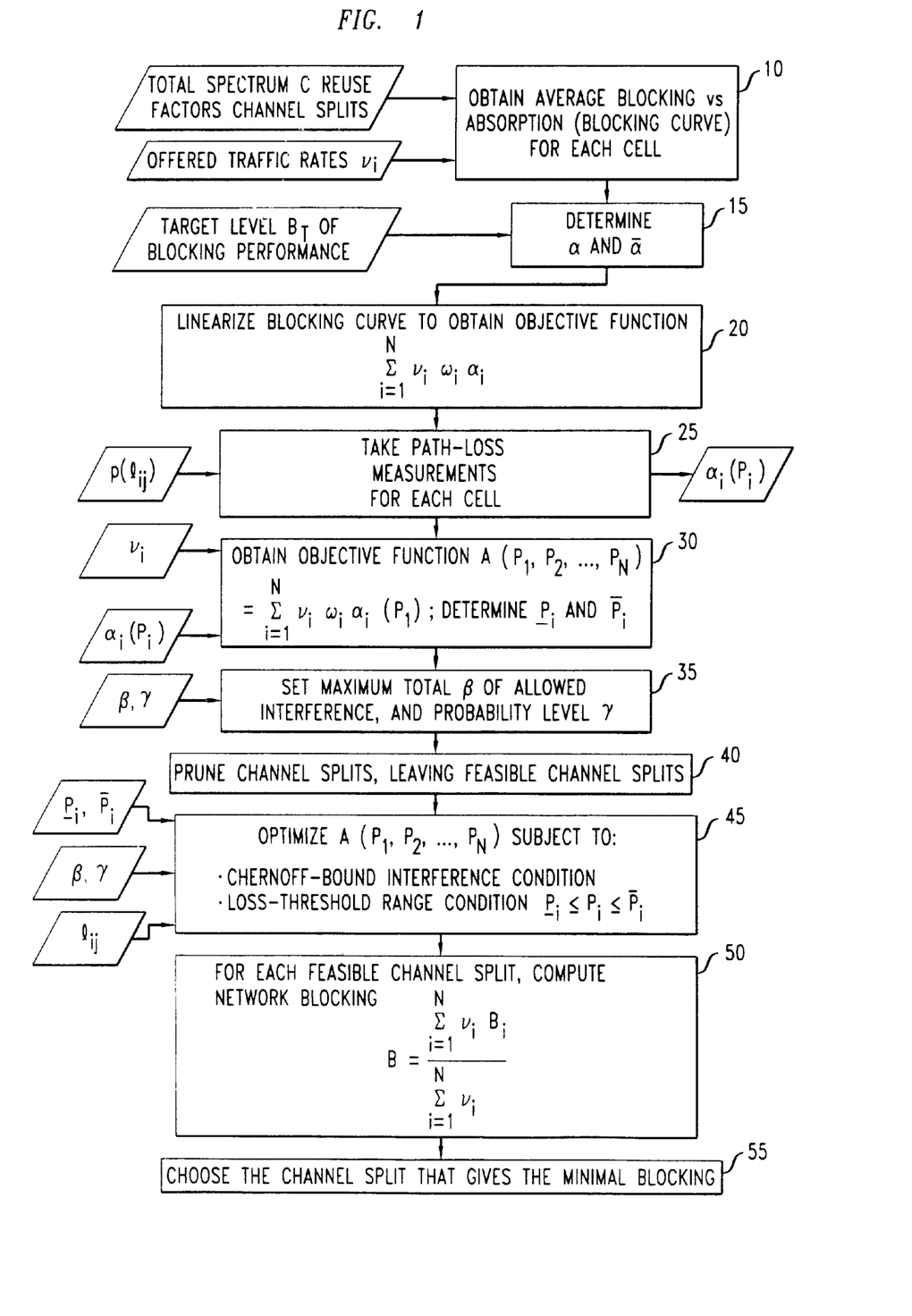
FIG. 1 is a flowchart of an illustrative embodiment of the invention, in a broad aspect.

Turning now to FIG. 1, there is shown as block 10 a step of obtaining the blocking curve for each cell. Table 1 provides mathematical details of a particular traffic model from which blocking curves can be obtained. This particular stochastic model has certain convenient properties. However, it should be noted that other models based upon theory and/or upon empirical observations may also be used. A general feature of models useful in this regard is that they are sensitive to the total spectrum C, the channel split, and the offered traffic rate (to each given cell) as inputs, as shown in the figure. Importantly, such models often generate a blocking curve that levels off for absorption values above a threshold. Above such a threshold, a given increase in the absorption produces relatively little further improvement in blocking behavior.

Shown as block 15 is a step of determining the lower and upper ends of the operating range. The lower end is set at the smallest absorption value that suffices to provide a stated target level of blocking performance. The upper end is set at a threshold value of the absorption (if there is such a value), above which the rate of further improvement is deemed small. If there is no such threshold value, the upper end is set, e.g., at 1. The absorption values at the respective lower and upper ends of the operating range are here denoted $\underline{\alpha}$ and $\overline{\alpha}$.

Let A represent the overall call acceptance rate of the network, obtained by summing, over each cell, the products $v_i A_i$, where $v_i$ is the rate of traffic offered to cell i, and $A_i$ is the fraction of calls offered to cell i that are accepted. $A_i$ is equal to $1-B_i$. Thus, letting $\alpha_i$ represent the absorption in cell i, the call acceptance rate A can be expressed by:

$$A = \sum_i v_i A_i = \sum_i v_i(1-B_i) = \sum_i v_i\{1-\alpha_i B_i^{(inner)} - (1-\alpha_i)B_i^{(outer)}\}. \quad (1)$$

The summations in the preceding expression are taken over all cells i of the network.

Those skilled in the art will appreciate that if the function A is suitably normalized, the quantity 1−A represents the average blocking rate of the network.

Figure 8:
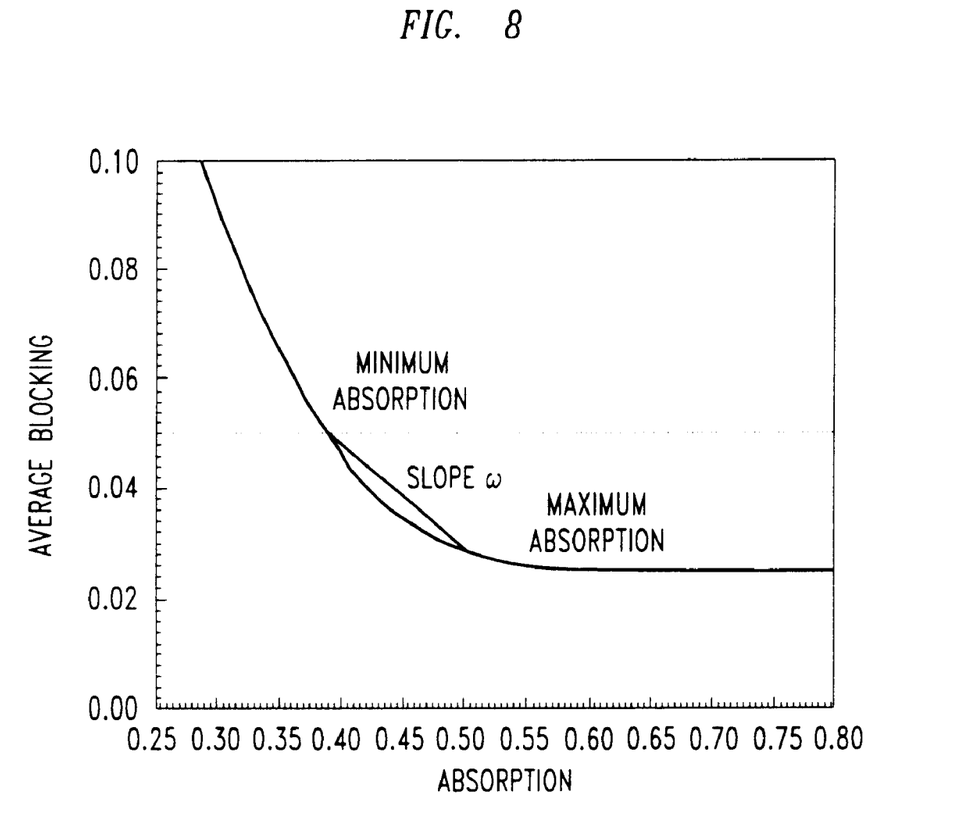
FIG. 8 is an illustrative single-cell blocking curve. Also indicated in FIG. 8 is a linear approximation to a portion of the blocking curve that extends between lower and upper absorption values.

An exemplary single-cell blocking curve is shown in FIG. 8. Also indicated in FIG. 8 is a linear approximation to a portion of the blocking curve that extends between lower and upper absorption values.

The average blocking rate, or equivalently, the overall call acceptance rate, is advantageously approximated by a linear expression of the form $$\tilde{A}(P) = K(C_A, C_B) + \sum_i v_i \omega_i \alpha_i(P_i).$$

In the preceding expression, the quantity K depends upon the channel split ($C_A$, $C_B$). In the summation, each term $\omega_i$ represents a slope, for cell i, of the blocking curve (as a function of absorption), and each term $\alpha_i$ represents the absorption in cell i as a function of path-loss threshold $P_i$ for cell i. This function is determined empirically from, e.g., call statistics. Through the functional dependencies of the cell absorptions, the function $\tilde{A}(P)$ is a function of the vector P of path-loss thresholds $P_i$. As will be described below, the function $\tilde{A}(P)$ leads to an objective function useful in a procedure for optimizing the blocking performance of the network.

It should be noted that although the linear approximation described here is particularly useful, alternative approximations, such as second-order or even higher-order approximations, can also be used. It should be noted further that the approximation to the blocking function should preserve the property of concavity, which is a requirement justified by the convexity of the blocking curves in FIG. 7. Shown as block 20 in FIG. 1 is a step of composing an objective function A(P) by summing the respective, exemplarily linear, absorption-dependent approximations over all of the cells in the network. That is, for a given channel split, the quantity $K(C_A, C_B)$ of the preceding expression for $\tilde{A}(P)$ is neglected, and the remaining portion is taken as the objective function; i.e., $$A(P) = \sum_i v_i \omega_i \alpha_i(P_i).$$

As noted, the underlay boundary in each cell is defined by a respective path-loss threshold $P_i$. That is, those mobile stations having path loss (to the serving base station) that is below the threshold belong to the underlay, and those having path loss above the threshold belong to the overlay. Ultimately, the objective function will be optimized with respect to these path-loss thresholds.

To make this possible, the respective absorption $\alpha_i$ in each cell must be related to the corresponding path-loss threshold, such that a parametric dependency $\alpha_i(P_i)$ is established. This is done by measuring path losses between mobile stations and base stations, as indicated by box 25 of the figure. For each mobile station that participates in this measurement process, the path loss is measured both to the mobile's own serving base station, and also to neighboring base stations. According to one convenient method for carrying out such measurements, each mobile station measures the received power level of a pilot signal broadcast from the pertinent base station at a known transmitted power. The result of such a measurement is readily transmitted to a central location for processing in accordance with the procedures that are to be described.

A measurement as described applies, in a strict sense, only to the path loss on the downlink. However, in most cases the uplink and downlink path losses are reciprocal within a close approximation, and thus they may generally be assumed to be equal for purposes of implementation of the procedures described here. Those skilled in the art will understand that alternate measurement procedures may be used in those circumstances in which reciprocity cannot be assumed.

In at least some cases, it will be advantageous to carry out the absorption measurement over a period of time. Such period may be a specifically defined period of interest, such as a known high-traffic period. Furthermore, the absorption measurement may be a historical record that has been compiled over, days, weeks, or longer. Such a record is obtained, for example, by periodically polling the participating mobile stations, and accumulating a running average.

Figure 5:
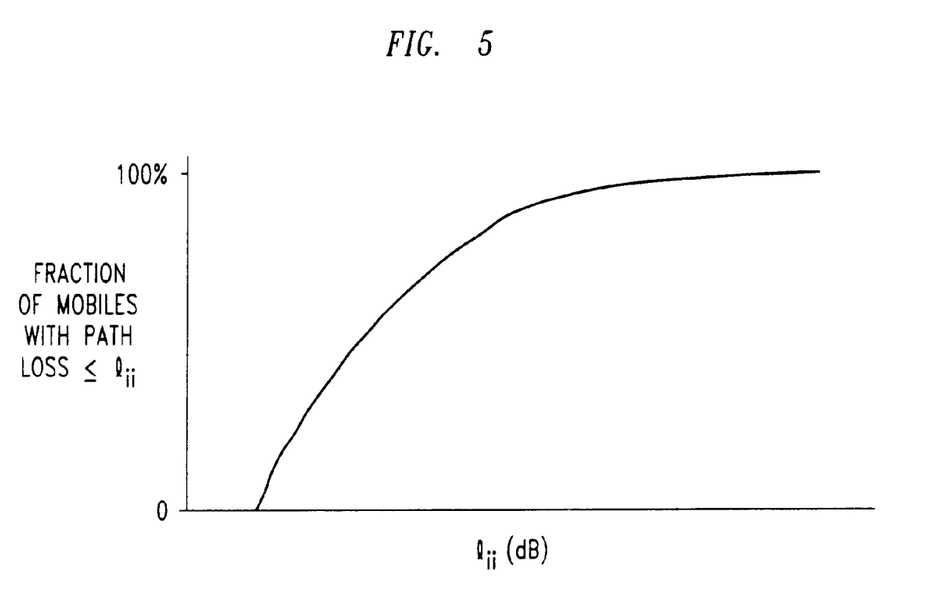
FIG. 5 is a histogram of in-cell path loss, from which absorption can be obtained as a function of the underlay boundary.

The results of the absorption measurement are exemplarily expressed in the form of a respective histogram for each cell, such as the histogram of FIG. 5. As shown, the horizontal axis represents values of the path loss $l_{ii}$ within the cell. (The first index identifies the cell in which the mobile station is located, and the second index identifies the cell in which the base station is located.) Plotted on the vertical axis is the cumulative fraction (from 0% to 100%) of mobile stations having path loss less than or equal to the given value $l_{ii}$. If the value on the horizontal axis is now read as $P_i$ rather than as $l_{ii}$, the absorption $\alpha_i(P_i)$ may be read directly from the resulting graph.

From these results, the objective function is readily obtained as a function of $P_i$, i=1, . . . , N, and the values of $P_i$ at the respective low and high ends of the operating range (denoted $\underline{P_i}$ and $\overline{P_i}$, respectively) are readily obtained, as indicated by box 30 of FIG. 1. In the figure, the objective function is here denoted $A(P_1, P_2, \ldots, P_N)$.

Figure 6:
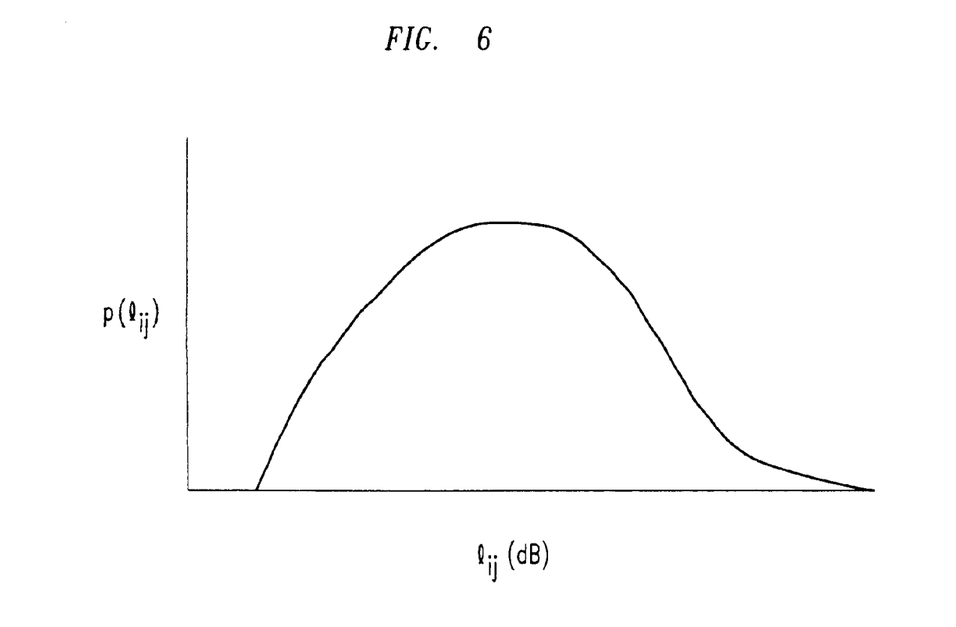
FIG. 6 is a histogram of cell-to-cell path loss, from which path-loss probabilities may be obtained.

As noted, path-loss measurements are carried out not only within individual cells, but also between the mobiles of each i'th cell and the base station of each different interfering j'th cell, i, j=1, . . . , N. The result of the full set of path-loss measurements is exemplarily expressed in the form of a histogram for each pair of cells, such as the histogram of FIG. 6. As shown, the pertinent path loss $l_{ij}$ is plotted on the horizontal axis. Plotted on the vertical axis is the fraction $p(l_{ij})$ of pertinent mobile stations having path loss equal to the given value $l_{ij}$. (It should be noted that unlike the graph of the preceding figure, the graph of FIG. 6 is normalized such that the total area under the graph is unity.) As will be discussed below, the path-loss probability values $p(l_{ij})$ are important for defining the interference constraints that apply to the optimization of the objective function.

Turning again to FIG. 1, there is shown as box 35 a step of setting a maximum total of allowed interference in each cell, denoted β, and a probability level γ. These values are used to define an interference constraint that is imposed on the optimization problem. Simply stated, the risk that the total interference in each cell exceeds (or equals) β must be less than (or equal to) γ.

Exemplarily, a worst case measure of the total network interference is used in applying this constraint. According to such measure, each interfering mobile station (of cell i) is assumed to be an underlay mobile station transmitting at transmitted power $P_i$. That is, assuming power control with unit received power at the base station, all of the B-mobiles are treated as though they are situated at the underlay boundary. Thus they are transmitting at maximum power and are assumed to be situated as close as possible to the cell boundary. The interfering power received at base station j from each mobile station i is thus taken to be the product $P_i l_{ij}$. The total interference at base station j is obtained by summing these contributions over the clique c(j) of cell j; that is, over the set of neighboring cells i that are co-channel interferers of cell j.

In the simplest case, there is no more than one interfering mobile station per cell. Exceptions may occur in, for example, frequency-hopping systems. However, it should be noted that when frequency hopping is employed (as, for example, in GSM systems), interference will typically arrive from several mobile stations in succession. (There will, however, still be only one interferer per cell at a given time.) Essentially the same treatment as described above can be applied in this case, except that the setting of β (and possibly also of γ) may, in fact, be somewhat more favorable in the frequency-hopping case.

It should be noted that the interference constraint described above is a constraint on uplink interference; that is, on interference received at the base stations from the mobile stations. In many practical situations, uplink interference is more troublesome than downlink interference. The constraint described here is advantageously applied in such situations. Those skilled in the art will recognize that alternative formulations, constraining interference in the downlink direction, are also readily devised. Such formulations are also to be included within the scope and spirit of our invention. Below, we describe a modified formulation that constrains interference in both the uplink and downlink directions.

Those skilled in the art will appreciate that there are practical obstacles to direct application of the interference constraint as stated above. Therefore, in practice, we apply a modified constraint that approximates the interference constraint stated above, and that is more readily applied to the optimization problem. We refer to the modified constraint as the Chernoff-Bound Interference Condition (CBIC). We discuss the CBIC below in connection with FIG. 2. Significantly, the CBIC is at least as stringent as the above-stated interference constraint, which is therefore satisfied whenever the CBIC is satisfied.

Turning again to FIG. 1, there is shown as block 40 a step of pruning the channel splits, leaving only those channel splits that are "feasible." Pruning is desirable in order to reduce the number of candidate channel splits for which the optimization problem is separately carried out.

Various criteria may be used to determine which channel splits are "feasible." To be feasible, a channel split must provide enough underlay channels to meet the target level of blocking performance at some value of the absorption. Channel splits that fail to do so are therefore not feasible. A further test for feasibility is whether a given channel split meets the interference constraint in every cell. If this constraint is violated in any cell, the channel split is not feasible. Because this test is conveniently applied using the CBIC, we discuss the feasibility tests in further detail below, in connection with FIG. 2. Those skilled in the art will appreciate that additional feasibility tests can be devised, which may further reduce the number of remaining candidate channel splits. For example, at least some TDMA systems, such as GSM systems, can only allocate channels in groups corresponding to whole carriers.

The optimization problem is shown as box 45 of FIG. 1. As noted, the problem is to optimize the objective function $A(P_1, P_2, \ldots, P_N)$ with respect to the path-loss thresholds $P_i$. The optimization problem is constrained by the interference constraint, represented in our current implementation by the CBIC. As a second constraint, we impose the Loss-Threshold Range Condition that each of the path-loss thresholds must remain within its respective operating range; i.e., that $\underline{P_i} \leq P_i \leq \overline{P_i}$.

The result of step 45 is an optimal set of path-loss thresholds for each of the feasible channel splits. There remains to select, from these optimal sets, that which gives the best overall network performance.

For each cell i, a single-cell average blocking factor $B_i$ can be calculated from the traffic model, using the total spectrum C, the channel split, the offered traffic rate $v_i$, and the respective proportions of A-mobiles and B-mobiles. (See Table 1 and Equation 1.) Measurements of the offered traffic rate are readily available from the call records maintained by the network operator (which is resident in computing facilities associated with the pertinent base station). The respective proportions of A-mobiles and B-mobiles are obtainable from, e.g., the histogram of in-cell path loss, such as that shown in FIG. 5. Shown in FIG. 1 as block 50 is a step of computing the total average network blocking B. As shown, B is computed as a weighted sum of the single-cell blocking factors $B_i$, in which the weight of each cell's contribution is given by the rate of traffic offered to that cell, expressed as a fraction of the total rate of traffic offered to all cells of the network.

As shown in the figure in block 55, the results of block 50 are readily used to determine which of the channel splits gives the least total average blocking for the network as a whole. That channel split, and the corresponding set of path-loss thresholds, are chosen as the optimal U-O network design parameters.

The computational steps described above, and flowcharted in FIG. 1, will typically be carried out by general purpose digital computers, or special purpose digital processors. These computers or processors will typically operate off-line, for example at a company office. However, it may in some cases be advantageous for the pertinent functions to be performed by one or more on-line digital processors located, e.g., at the Mobile Switching Center.

Figure 2:
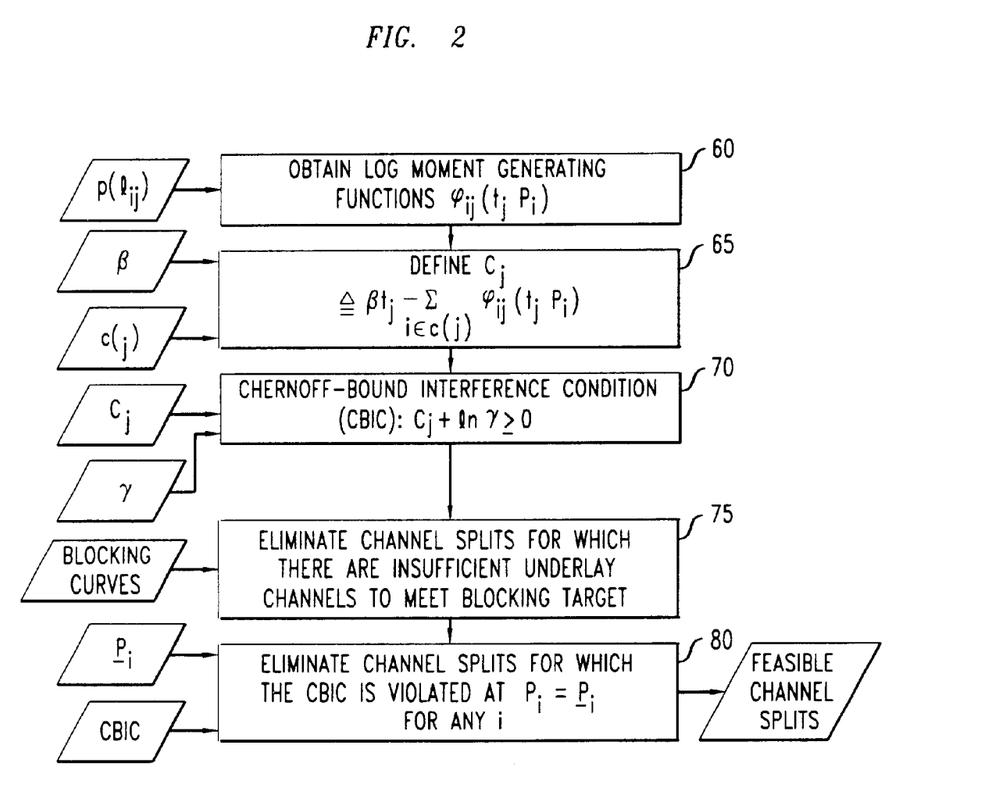
FIG. 2 is a flowchart in which one of the procedures of FIG. 1, referred to as pruning the channel splits, is expanded into a more detailed sequence of steps.

The pruning function, shown as block 40 of FIG. 1, is shown in expanded detail in the flowchart of FIG. 2, which also includes the definition of the CBIC. Turning to FIG. 2, there is shown as block 60 a step of obtaining, from the path-loss probabilities $p(l_{ij})$, the set of log moment generating functions $\phi_{ij}(t_j P_i)$ of the path loss from cell i to cell j.

The log moment generating function of any random variable x is obtained by taking the natural logarithm of the (statistical) expected value of the expression $e_{tx}$, where t is a new free variable, referred to as the Chernoff parameter. In the present case, the Chernoff parameter for a given cell j is denoted $t_j$, and the random variable x is, for each cell-pair ij, the product of $P_i$ times the corresponding path loss $l_{ij}$. The probability distribution of this random variable is readily derived from $p(l_{ij})$.

Recall that the original interference constraint placed an upper bound γ on the probability that total interference in a cell would exceed a level β. Equivalently, the negative logarithm of this probability must be greater than or equal to −ln γ. Those familiar with the use of Chernoff bounds will appreciate that it is readily shown that the negative log probability of interest must be greater than or equal to the following expression in $t_j$, for any positive value of tj:

$$\beta t_j - \sum_{i \in c(j)} \varphi_{ij}(t_j P_i).$$

Here, the summation is carried out over all cells in the clique of cell j. We denote this expression (which is separately evaluated for each cell j) by the symbol $C_j$. Because the negative log probability is at least $C_j$, it follows that the original interference constraint is satisfied whenever $C_j$ is greater than or equal to −ln γ. This is the CBIC. Equivalently stated, the CBIC is $C_j + \ln \gamma \geq 0$.

Turning again to FIG. 2, shown as block 65 is the definition of $C_j$, and shown as block 70 is the definition of the CBIC. At block 75, there is pruned out any channel split whose blocking curve fails to achieve the target level of blocking for any value of the absorption. Such failure is generally attributable to insufficiency of underlay channels. At block 80, there is pruned out any channel split for which the CBIC is violated in any cell, when the corresponding path-loss threshold $P_i$ is set to its lowest limit $\underline{P_i}$. A channel split will be retained by this test as potentially feasible, provided the CBIC is satisfied for some positive value of the Chernoff parameter, in each cell i.

Figure 3:
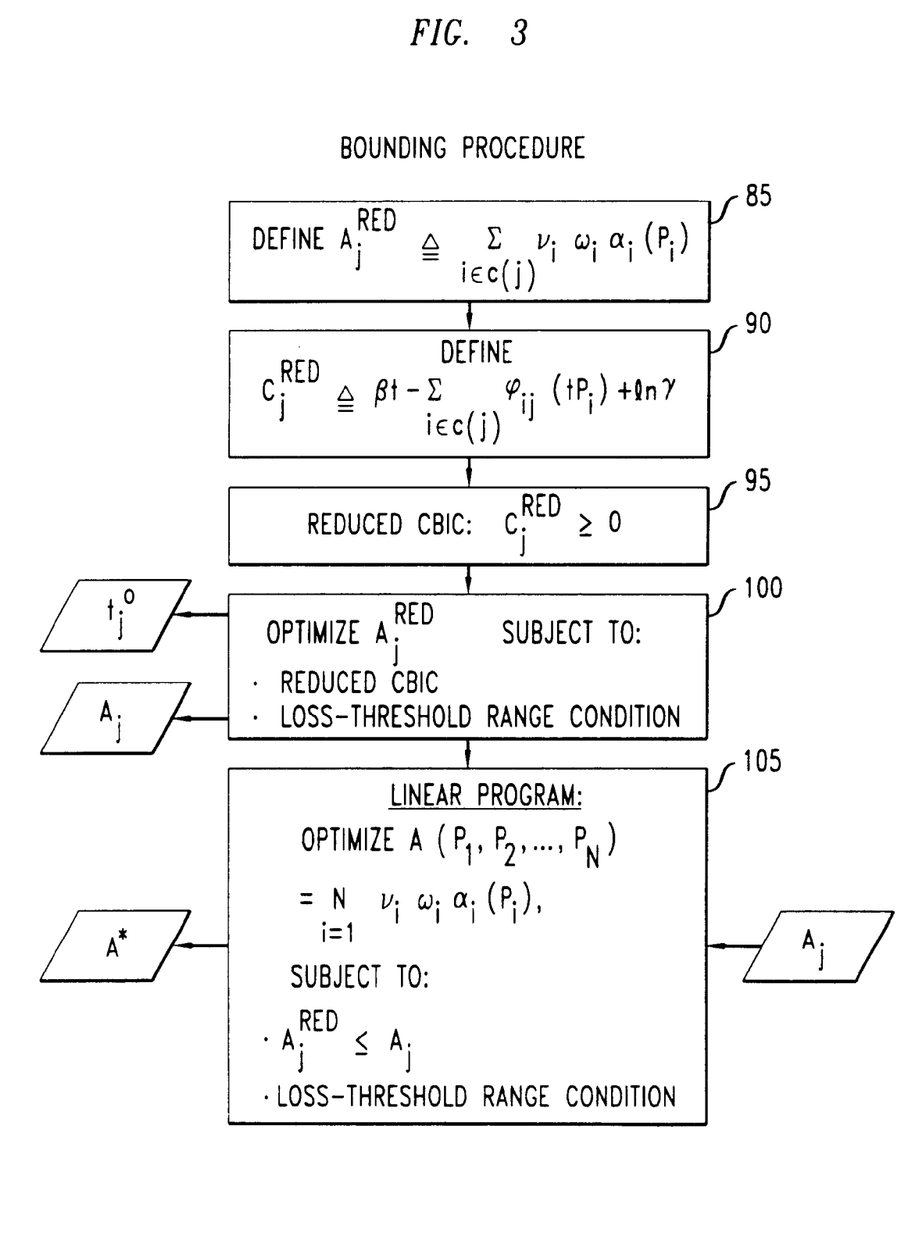
FIG. 3 is a flowchart of a bounding procedure, useful in carrying out the optimization procedure of FIG. 1.
Figure 4A:
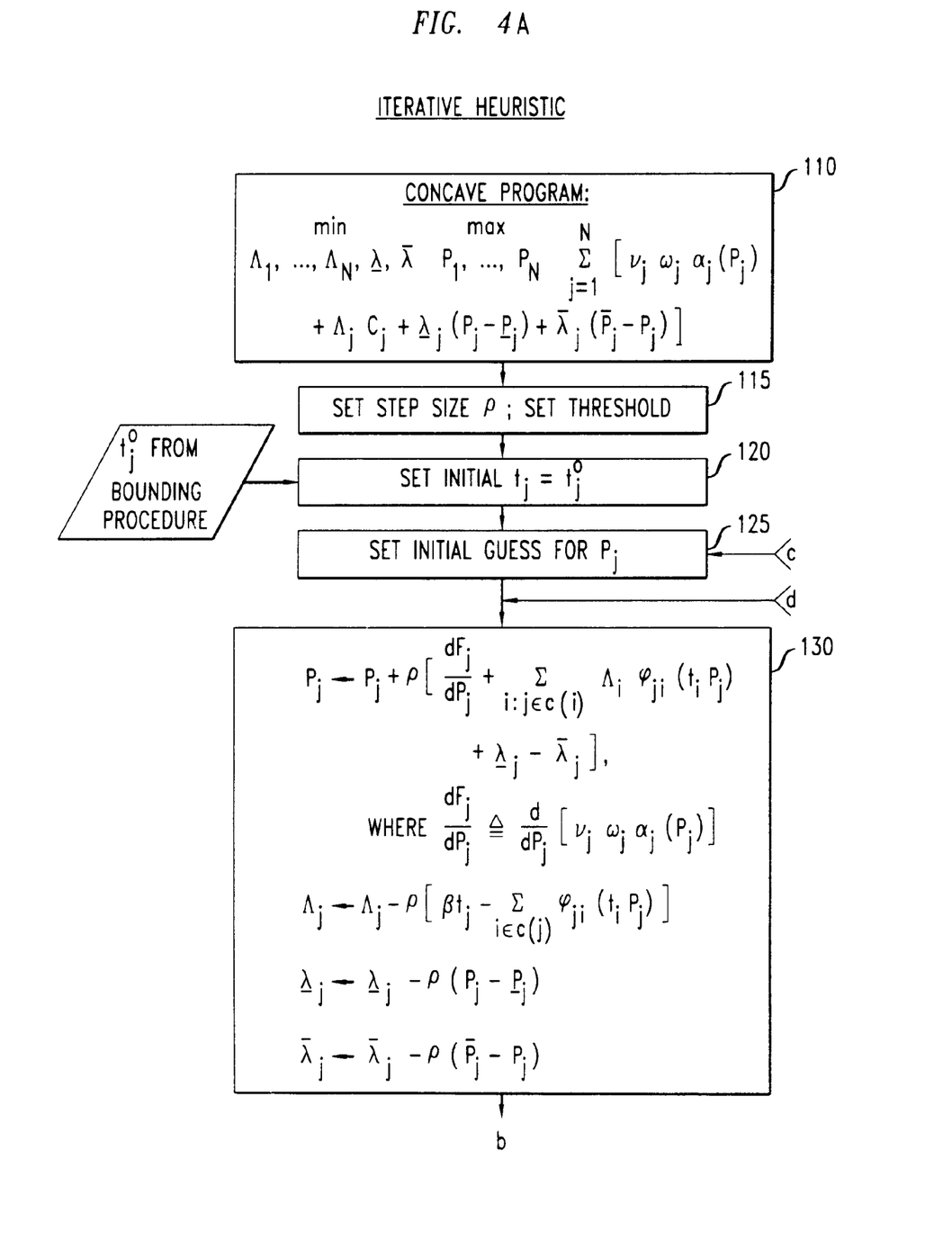
FIG. 4 is a flowchart of an iterative heuristic, useful in carrying out the optimization procedure of FIG. 1.
Figure 4B:
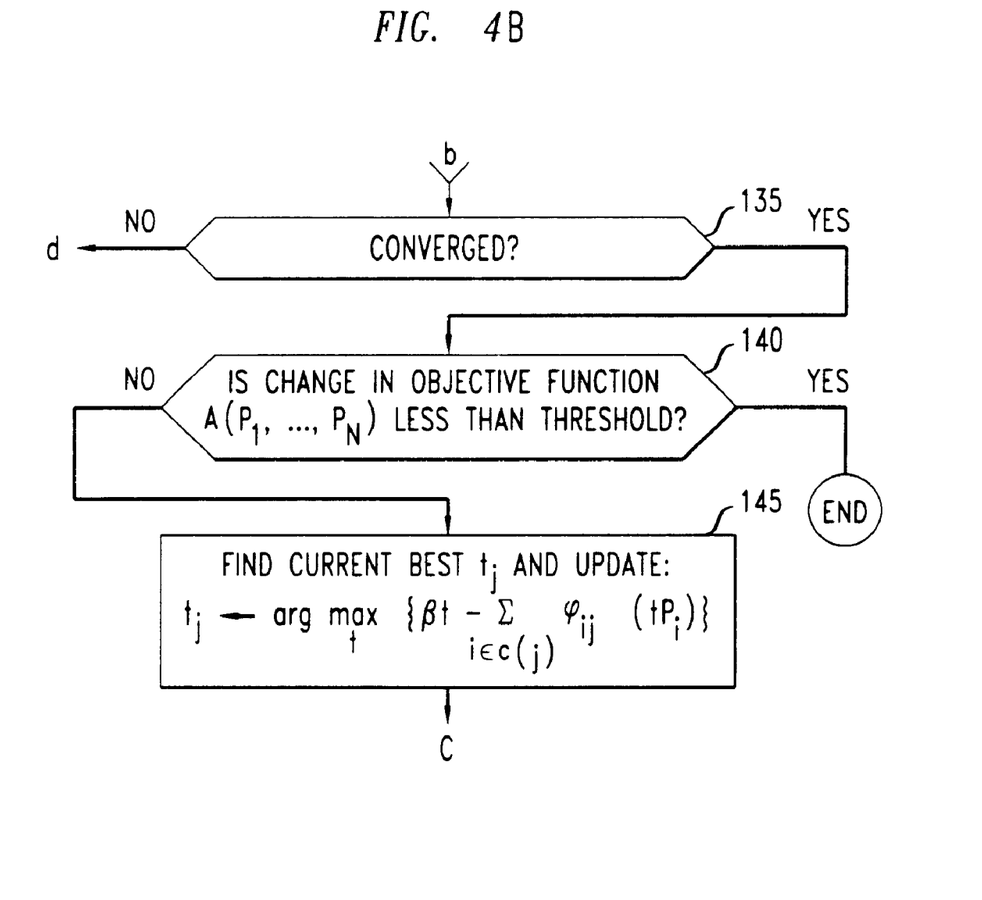

The optimization procedure is illustrated by FIGS. 3 and 4. It should be noted in this regard that the optimization problem is not, in general, a concave problem. As a consequence, the objective function may have more than one local maximum. In order to provide assurance that the solution converges to a maximum at or near the overall maximum, we first solve a reduced optimization problem that results in an upper bound A* on the objective function.

We refer to our procedure for solving this reduced problem as the Bounding Procedure. Because the Bounding Procedure is less constrained than the full optimization problem, A* cannot be less than the solution of the full optimization problem. Thus, the solution to the full optimization problem can safely be accepted when it is sufficiently close to A*, according to an appropriate criterion.

The Bounding Procedure is illustrated in FIG. 3, to which reference is now made. As indicated in block 85, a reduced objective function $A_j^{RED}$ is defined for each cell j by restricting the summation in the original objective function to only those cells that belong to the clique of cell j. As indicated in block 90, a reduced CBIC factor $C_j^{RED}$ is defined for each cell j by replacing all of the cell-specific Chernoff parameters $t_j$ by a single Chernoff parameter t. As indicated in block 95, a Reduced CBIC is defined. This condition is that for each cell j, $C_j^{RED}$ must be non-negative.

Indicated in block 100 is an optimization problem that is carried out separately for each cell j. The optimization is constrained by the Reduced CBIC and by the Loss-Threshold Range Condition. The optimization is carried out relative to those path-loss thresholds $P_i$ that belong to the clique of cell j, and relative to the Chernoff parameter t. Significantly, this problem can be solved, using standard techniques, for each of a set of distinct values of t, and then that value of t can be chosen that gives the best result. For each cell j, we denote such best value of t by the symbol $t_j^O$. The maximum of the reduced objective function for each cell j is denoted $A_j$.

More specifically, standard methods are used to solve a concave program for each fixed value of t. Significantly, a concave program has a guaranteed, unique solution. The best of all the fixed values of t is then identified using standard one-dimensional methods, such as the golden section search. In fact, in at least some cases the best value of t will be evident from inspection of the graphically plotted solutions.

The procedures of block 100 provide, for subsequent use, a Chernoff parameter $t_j^O$ and an upper bound $A_j$ for each cell j.

Shown in block 105 is a further optimization procedure. The problem in block 105 is to optimize the original objective function $A(P_1, P_2, \ldots, P_N)$, subject to the Loss-Threshold Range Condition, and subject to a new constraint. The new constraint is that for each cell j, the reduced objective function $A_j^{RED}$ must remain less than or equal to the corresponding bound $A_j$ obtained from the procedure of block 100. The problem of block 105 can be stated as a linear program and solved by conventional techniques. For example, it can be mapped into a flow problem that is readily solved using the well-known Ford-Fulkerson theorem. The resulting optimum value is the upper bound A*. A well-known reference describing the Ford-Fulkerson theorem is L. R. Ford and D. R. Fulkerson, *Flows in Networks,* Sixth Edition, Rand Corporation, 1974.

In theoretical terms, the original optimization problem may be described as maximizing the sum over cells of given concave functions of the path-loss thresholds $P_i$. Each of these given concave functions represents the carried traffic in a given cell. As noted, the optimization is carried out subject to two constraints. One of these constraints, the CBIC, involves functions $\Phi_{ij}$, which are convex functions of their respective arguments $t_j$, $P_i$. The functions $\Phi_{ij}$ are convex with respect to the $t_j$ and the $P_i$ separately, but not when they are taken together. Therefore, the CBIC is a concave constraint with respect to the $t_j$ alone, and similarly for the $P_i$ (since the $\Phi_{ij}$ appear with a negative sign). However, concavity fails when the $t_j$ and the $P_i$ are considered jointly.

Standard procedures are available for solving concave programs. We have taken the approach of fixing the values of the $t_j$. This leads to a concave program that can be solved conventionally, using, e.g., an iterative procedure based on the gradient descent technique. After this iterative procedure has converged, the resulting optimal values of the path-loss thresholds $P_i$ can be used as input to a simple set of one-dimensional optimizations that leads to refined values for the $t_j$. These become the new fixed $t_j$ for another iteration of the concave program. (At this stage, the concave program is guaranteed to produce a strictly better solution for the $P_j$, since the previous values of the $P_j$ remain feasible for this new concave program.) These iterations are repeated until further improvements in the full objective function $A(P_1, P_2, \ldots, P_N)$ fall below a threshold.

It should be noted in this regard that for each set of path-loss thresholds $P_i$, there will be some set of values for the Chernoff parameters $t_j$ that are "best" in the sense that they maximize the left-hand side of the CBIC. Our procedure for refining the values of the $t_j$ is intended to be biased in the direction of such best values.

Thus, we have devised a doubly iterative procedure, in which the concave program is solved iteratively, and then solved again using refined input values. We describe this procedure as an iterative heuristic, and we denote it by the symbol ITER.

The iterative heuristic, ITER, has the following steps:
 (i) Solve for the optimal $t_j$.
 (ii) For this $t_j$, solve the concave program.
 (iii) Repeat the procedure until the change in objective value is satisfactorily small.

However, before embarking on heuristic IHER to solve a specific instance of this problem, it is desirable to prove the existence of a solution. A feasibility test for that purpose will now be described. We note first that the minimum risk of interference to a given cell j occurs when all of its neighbors have the lowest possible threshold values; i.e., $P_i = \underline{P_i}$ for all $i \in c(j)$. It then follows that $$t_j \beta - \sum_{i \in c(j)} \varphi_{ij}(tP_i) + \log \gamma \geq 0$$

for all j and some positive set of Chernoff parameters $t_j$. We hence verify the conditions for the maximizing values $t^*_j$, which can be shown to be unique using the concavity of the $\Phi_{ij}$. Conversely, if this condition holds, then we may set $P_j = \underline{P_j}$ to obtain a feasible solution, which makes the condition necessary and sufficient. Since the tests only involve solving a set of single-parameter equations for the optimizing t values and the corresponding risks, they provide an efficient method for checking feasibility.

FIG. 4 depicts various stages and processes of ITER. The concave program is defined in box 110. The well-known technique of Lagrange multipliers is used to incorporate the constraints. The specific Lagrange multipliers are $$\Lambda_j, \underline{\lambda}_j, \text{ and } \overline{\lambda}_j, j=1,2,\ldots,N.$$

At box 115, a step size $\rho$ is determined for the refinements in the values of the path-loss thresholds and the Lagrange multipliers that are to take place in box 130. Also at box 115, a threshold is determined for the test, at box 140, of whether the rate of improvement of the objective function is small enough for ITER to be terminated.

At box 120, the $t_j$ are initialized to the respective values $t_j^0$ obtained from the Bounding Procedure of FIG. 3. These values are significant because they correspond to the upper bound $A_j$. Experience has shown that this is an effective way to initialize ITER. However, other methods can also be used. For example, the $P_i$ can initially be set at their lower limits. It should be noted in this regard that we have found that the optimal solution is relatively insensitive to the values of the $t_j$.

At box 125, an initial guess is set for the path-loss thresholds. If the procedure returns to this step from box 145, the initial guess may be made with or without memory of the previous values for the path-loss thresholds.

At box 130, the values for the path-loss thresholds and the Lagrange multipliers are updated in accordance with the gradient descent method. This step is iterated until the test represented by box 135 indicates that convergence has been achieved.

After the procedure of box 130 has converged, the further test indicated as box 140 is applied. According to this test, the last change in the objective function is compared to a threshold. If the change is less than the threshold, ITER is deemed to have converged, and it is terminated. If ITER is not deemed to have converged, it proceeds to box 145.

At box 145, the best set of values for the $t_j$, using the current set of values for the $P_i$, is obtained. These values of $t_j$ are returned to the procedure of box 130 for a new iteration. For each cell j, the best value of $t_j$ is set equal to that value of t that maximizes the expression.

$$\beta t - \sum_{i \in c(j)} \varphi_{ij}(tP_i).$$

Such value is readily determined by conventional techniques such as the golden section search.

It should be noted that the concave program is solved taking all of the cell constraints together, i.e., over the entire network. However, the operations of box 145 are carried out cell-by-cell.

The result of ITER is a set of values for the $P_i$ that maximize the objective function $A(P_1, \ldots, P_N)$. As noted, comparison of this maximal value with the upper bound A* provides an indication whether the overall maximum has been approached.

As noted above, interference constraints can be applied in both the downlink and the uplink directions. Modifications of the above-described procedures, to effectuate such purpose, are now described with reference to the figures. Turning to FIG. 2, box 60 is modified by including two families of log moment generating functions, denoted $\Phi_{ij}^u$ ($t_j P_i$) and $\Phi_{ij}^d$($t_j P_i$), respectively. (These functions are distinct to the extent that reciprocity fails between the uplink and downlink directions. When reciprocity holds, $\Phi_{ij}^u = \Phi_{ji}^d$.) Box 65 is modified by including two CBIC factors $C_j^u$ and $C_j^d$, defined respectively by $$C_j^u = \beta t_j^u - \sum_{i \in c(j)} \varphi_{ij}^u(t_j^u P_i) \text{ and } C_j^d = \beta t_j^d - \sum_{i \in c(j)} \varphi_{ij}^d(t_j^d P_i).$$

Box 70 is modified by including two respective CBICs: $C_j^u + \ln \gamma \geq 0$, $C_j^d + \ln \gamma \geq 0$.

Turning to FIG. 3, box 90 is modified by having two respective reduced CBIC factors defined, namely $C_j^{RED,u}$ and $C_j^{RED,d}$. These are defined in a manner similar to the CBIC factors, above, except that the Chernoff parameters $t^u$, $t^d$ are not subscripted. Box 95 is modified by including the two respective reduced CBICs, and in box 100, the optimization is constrained by two CBICs instead of one. The output of box 100, and initial input to box 120 (see FIG. 4) is modified to include two respective sets of Chernoff parameters $t_j^{0,u}, t_j^{0,d}$. The problem stated in box 100 becomes two-dimensional.

Turning to FIG. 4, the summation term for the CBIC factor in box 110 is expanded to the sum $\Lambda_j^u C_j^u + \Lambda_j^d$. Box 120 is modified to initialize two sets of Chernoff parameters $t_j^{0,u}, t_j^{0,d}$. Box 130 is modified by including two respective update expressions for Lagrange multipliers $\Lambda_j^u$, and $\Lambda_j^d$:

$$\Lambda_j^u \leftarrow \Lambda_j^u - \rho \left[ \beta t_j - \sum_{i \in c(j)} \varphi_{ji}^u(t_i P_j) \right]$$

$$\Lambda_j^d \leftarrow \Lambda_j^d - \rho \left[ \beta t_j - \sum_{i \in c(j)} \varphi_{ji}^d(t_i P_j) \right].$$

Also in box 130, the update expression for $P_j$ is modified. The summation term $\Lambda_i \Phi_{ji}(t_i P_j)$ becomes the sum of two terms:

$$\Lambda_i^u \Phi_{ji}^u(t_i^u P_j) + \Lambda_i^d \Phi_{ji}^d(t_i^d P_j).$$

Box 145 is modified to update two respective sets of Chernoff parameters $t_j^u$ and $t_j^d$ according to:

$$t_j^u \leftarrow \operatorname*{argmax}_t \left\{ \beta t - \sum_{i \in c(j)} \varphi_{ij}^u(tP_i) \right\}, t_j^d \leftarrow \operatorname*{argmax}_t \left\{ \beta t - \sum_{i \in c(j)} \varphi_{ij}^d(tP_i) \right\}.$$

Accordingly, the output from box 145 to box 125 includes two sets of Chernoff parameters.

TABLE 1

Traffic Model $(r_A, r_B)$: Overlay and Underlay Reuse Factors.
$(n_A, n_B)$: Number of A and B mobiles
$(C_A, C_B)$: Number of A and B channels.
$(v_A = (1 - \alpha) v, v_B = \alpha v)$: Poisson Traffice for given absorption $\alpha$.
$r_A C_A + r_B C_B = C, n_A \leq C_A, n_A + n_B \leq C_A + C_B$
Product Form Solution for Equilibrium Distribution:

$$\pi(n_A, n_B) = G(C_A, C_A + C_B) \frac{v_A^{n_A}}{n_A!} \frac{v_B^{n_B}}{n_B!}$$

TABLE 1-continued $$G(C_A, C_A + C_B) = \sum_{n_A \leq C_A, n_A + n_B \leq C_A + C_B} \frac{v_A^{n_A}}{n_A!} \frac{v_B^{n_B}}{n_B!}$$

Blocking:

$$B^{inner} = 1 - \frac{G(C_A - 1, C_A + C_B - 1)}{G(C_A, C_A + C_B)}$$

$$B^{outer} = 1 - \frac{G(C_A, C_A + C_B - 1)}{G(C_A, C_A + C_B)}$$

$$B_T = \alpha B^{inner} + (1 - \alpha) B^{outer}$$
$$\alpha = A(v, B_T, C_A, C_B)$$

What is claimed is:

1. A method for partitioning the mobile stations occupying each of a plurality of cells of a wireless communication network between an overlay and an underlay, wherein:
  (i) each cell has a base station,
  (ii) within each cell there is a path loss between the base station and each mobile station of that cell;
  (iii) a plurality of communication channels is available to the network; and
  (iv) said channels are allocable as overlay channels or underlay channels, each possible allocation of all said channels to be referred to as a channel split;
  the method comprising:
    determining a path-loss threshold for each cell according to a procedure that seeks to drive network capacity up while satisfying a rule that relates to intercell interference;
    repeating the threshold-determination procedure for each of a plurality of possible channel splits, thereby to determine that channel split which yields the greatest network capacity while satisfying the rule that relates to intercell interference;
    within each cell, assigning each of that cell's mobile stations to the overlay if the mobile station's corresponding path loss exceeds the pertinent path-loss threshold, and to the underlay if its corresponding path loss lies below the pertinent path-loss threshold; and
    allocating the plurality of communication channels according to the channel split that has been determined to yield the greatest network capacity while satisfying the rule that relates to intercell interference.

2. The method of claim 1, wherein:
  the plurality of channel splits, over which the threshold-determination procedure is repeated, is a pruned set of channel splits; and
  the pruned set comprises only those channel splits that satisfy a rule that relates to call blocking and a rule that relates to intercell interference.

3. The method of claim 2, wherein the call-blocking rule requires that there be enough underlay channels to permit the average rate of call blocking to fall below a threshold for some partition of the mobile stations between the overlay and the underlay.

4. The method of claim 3, wherein:
  the intercell-interference rule relates to a requirement that for a particular partition of mobile stations between the overlay and the underlay in each cell, the risk that the total interference in any cell exceeds a threshold $\beta$ must not exceed a further threshold $\gamma$.

5. The method of claim 4, wherein:
  the threshold-determination procedure is carried out using data that relate an average rate of call-blocking in each cell to the proportion of that cell's traffic that can be supported within the underlay, said proportion to be referred to as the absorption, and using data that relate the absorption in each cell to the corresponding path-loss threshold; and
  the particular partition to which the intercell-interference rule relates is determined by the smallest absorption for which a target level of call-blocking performance can be met.

6. A method for partitioning the mobile stations occupying each of a plurality of cells of a wireless communication network between an overlay and an underlay, wherein:
  (i) each cell has a base station, and
  (ii) within each cell there is a path loss between the base station and each mobile station of that cell; the method comprising:
    within each cell, assigning each of that cell's mobile stations to the overlay if the mobile station's corresponding path loss exceeds a path-loss threshold, and to the underlay if its corresponding path loss lies below the path-loss threshold; wherein:
      the path-loss threshold for each cell is determined according to a procedure that seeks to drive network capacity up while satisfying a rule that relates to intercell interference; and
      the threshold-determination procedure is an optimization procedure, and it is carried out using:
        data that relate an average rate of call-blocking in each cell to the proportion of that cell's traffic that can be supported within the underlay, said proportion to be referred to as the absorption; and
        data that relate the absorption in each cell to the corresponding path-loss threshold.

7. The method of claim 6, wherein the optimization procedure is carried out subject to a constraint that each cell's path-loss threshold must lie within an operating range.

8. The method of claim 7, wherein, for each cell:
  the operating range has a lower end corresponding to an absorption that is just sufficient for the average rate of call blocking to fall below a target level; and
  the operating range has an upper end above which the average rate of call blocking exhibits reduced sensitivity to absorption.

9. The method of claim 8, wherein the data that relate the average rate of call blocking in each cell to the absorption represent a linear relationship over the operating range.

10. A method for partitioning the mobile stations occupying each of a plurality of cells of a wireless communication network between an overlay and an underlay, wherein:
  (i) each cell has a base station, and
  (ii) within each cell there is a path loss between the base station and each mobile station of that cell; the method comprising:
    within each cell, assigning each of that cell's mobile stations to the overlay if the mobile station's corresponding path loss exceeds a path-loss threshold, and to the underlay if its corresponding path loss lies below the path-loss threshold; wherein
      the path-loss threshold for each cell is determined according to a procedure that seeks to drive network capacity up while satisfying a rule that relates to intercell interference;

the threshold-determination procedure is a procedure for optimizing the value of an objective function related to the call-blocking performance of the network;

the optimization procedure is carried out using data that relate an average rate of call-blocking in each cell to the proportion of that cell's traffic that can be supported within the underlay, said proportion to be referred to as the absorption;

the optimization procedure is carried out using data that relate the absorption in each cell to the corresponding path-loss threshold;

the absorption in each cell has an operating range having a minimum value just sufficient for the average rate of call blocking to fall below a target level, and a maximum value above which the average rate of call blocking exhibits reduced sensitivity to absorption;

the optimization procedure is carried out subject to a constraint that the absorption in each cell must lie within its operating range; and the optimization procedure is carried out subject to a bound on the risk that total intercell interference in any cell exceeds an interference threshold.

11. The method of claim 10, wherein:

the optimization procedure results in a solution comprising an optimized path-loss threshold for each cell;

corresponding to the solution, there is a respective, predicted level of call-blocking performance for each cell; and a constraint is imposed that prevents the optimization procedure from seeking unrealistic solutions that exceed a best-case level of blocking performance for each cell.

12. The method of claim 11, wherein the optimization procedure comprises:

carrying out, for each cell, an optimization procedure having relaxed constraints, thereby to obtain the corresponding best-case level of blocking performance for that cell; and carrying out a network-wide optimization procedure by solving a linear program subject to said constraints on the absorption operating range, interference risk, and the cell blocking performance.

13. The method of claim 11, wherein:

for each given cell, a corresponding clique is defined as the set of neighboring cells that are co-channel interferers of the given cell;

for each given cell, the optimization procedure having relaxed constraints comprises optimizing an objective function that relates to the blocking performance only of cells in the clique of the given cell; and for each given cell, said optimization procedure is carried out subject to a bound on the risk that total intercell interference in the given cell, from its corresponding clique, exceeds an interference threshold.

* * * * *